(12) United States Patent
Do et al.

(10) Patent No.: US 8,713,317 B2
(45) Date of Patent: Apr. 29, 2014

(54) METHOD AND SYSTEM FOR ENCRYPTING DATA IN A WIRELESS COMMUNICATION SYSTEM

(75) Inventors: Kyeong-Tae Do, Suwon-si (KR); Jung-Hun Park, Yongin-si (KR); Tae-Jin Kim, Siheung-si (KR); Jeong-Eun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 12/905,302

(22) Filed: Oct. 15, 2010

(65) Prior Publication Data
US 2011/0093711 A1 Apr. 21, 2011

(30) Foreign Application Priority Data

Oct. 16, 2009 (KR) .................. 10-2009-0098855
Dec. 23, 2009 (KR) .................. 10-2009-0130041

(51) Int. Cl.
*H04L 29/00* (2006.01)
(52) U.S. Cl.
USPC .......................................... 713/169; 380/270
(58) Field of Classification Search
USPC .......................................... 713/169; 380/270
See application file for complete search history.

(56) References Cited

U.S. PATENT DOCUMENTS

2011/0164750 A1* 7/2011 Maas et al. ............... 380/270

FOREIGN PATENT DOCUMENTS

EP 2281362 A2 * 2/2011

* cited by examiner

*Primary Examiner* — Brandon Hoffman
*Assistant Examiner* — Michael D Anderson
(74) *Attorney, Agent, or Firm* — Jefferson IP Law, LLP

(57) ABSTRACT

A method and system for encrypting data in a wireless communication system are provided. The system includes a first node for generating a first encryption key using a plurality of encryption key parameters when performing authentication with a second node, for changing a second parameter among the plurality of encryption key parameters to generate a second encryption key being identical to the first encryption key, if a first parameter among the plurality of encryption key parameters is changed during re-authentication between the first node and the second node, for generating the second encryption key using the changed first parameter and the changed second parameter, and for encrypting data to be transmitted to the second node using the second encryption key.

24 Claims, 6 Drawing Sheets

METHOD AND SYSTEM FOR ENCRYPTING DATA IN A WIRELESS COMMUNICATION SYSTEM

PRIORITY

This application claims the benefit under 35 U.S.C. §119 (a) of a Korean patent application filed in the Korean Intellectual Property Office on Oct. 16, 2009 and assigned Serial No. 10-2009-0098855, and a Korean patent application filed in the Korean Intellectual Property Office on Dec. 23, 2009 and assigned Serial No. 10-2009-0130041, the entire disclosures of both of which are hereby incorporated by reference.

BACKGROUND OF THE INVENTION

1. Field of the Invention

The present invention relates to a wireless communication system. More particularly, the present invention relates to a method and system for encrypting data in a wireless communication system.

2. Description of the Related Art

In a $4^{th}$ Generation (4G) communication system or a next-generation communication system, research is being developed to provide high-speed services having various Quality of Service (QoS) classes to users. More particularly, in the 4 G communication system, many studies have been conducted to support high-speed services guaranteeing mobility and QoS for Broadband Wireless Access (BWA) communication systems such as a wireless Local Area Network (LAN) system and a wireless Metropolitan Area Network (MAN) system. These wireless communication systems may include, for example, the Institute of Electrical and Electronics Engineers (IEEE) 802.16e and 802.16m standard communication systems. For convenience, in the following description, it is assumed that these wireless communication systems are IEEE 802.16e and 802.16m communication systems.

In a wireless communication system, a security sub-layer is used. The security sub-layer identifies a duly authorized user, Subscriber Station (SS) or a Mobile Station (MS) and allows the authorized SS to access the network. The security sub-layer also provides integrity of messages transmitted to the SS and a Base Station (BS). For the purpose of confidentiality of traffic data being transmitted and authentication of a sender, the security sub-layer includes a Privacy Key Management (PKM) protocol for transmitting a security key and its associated information from the BS to the SS. The PKM protocol facilitates mutual authentication between the SS and the BS, and enables distribution of an encryption key from the BS to the SS.

By authenticating the SS or user, the BS allows an authorized subscriber to access the network, but blocks access to the network by an attacker impersonating a legitimate subscriber. While the BS authenticates the SS, or the BS and the SS perform mutual authentication, an encryption negotiation is carried out to maintain confidentiality of the traffic data being transmitted. If a negotiation for encrypting traffic data is conducted in an authentication process, the BS is required to transmit a Traffic Encryption Key (TEK), a key used for encryption. The TEK is a key shared only between a specific SS and the BS, and is a key that should not be exposed to other SSs or systems.

In the wireless communication system, the TEK is commonly generated with a random number, and the TEK may be generated in the BS and transmitted to the SS. To transmit the TEK without exposure to the outside, the BS encrypts the TEK before transmission. A Key Encryption Key (KEK) is used to encrypt the TEK before transmission, and if authentication is completed, the KEK is generated in each of the SS and the BS.

If the TEK is transmitted to the SS, the BS encrypts traffic data using the TEK and transmits the encrypted traffic data to the SS. The SS decrypts the encrypted traffic data using the same TEK as that of the BS. Thus, the encryption performed using the TEK shared between the SS and the BS can ensure confidentiality of the traffic data being transmitted.

Meanwhile, in the wireless communication system, for continuous service provision, a re-authentication or re-authorization process should be performed and the TEK should be periodically updated. As a result, if a timer for a TEK update expires, the SS may request the BS to provide a new TEK. In response to the request, the BS encrypts a new TEK and transmits the new TEK to the SS. Therefore, the SS can update the TEK by decrypting the new TEK received from the BS.

In the wireless communication system, handover is performed to provide a seamless service to a moving SS.

An SS decides whether to handover by exchanging handover-related messages with a serving BS. Upon the decision to handover, the SS cell switches to a target BS, and then transmits a Ranging Request (RNG-REQ) message to the target BS. Upon receiving the RNG-REQ message, the target BS transmits a Ranging Response (RNG-RSP) message to the SS and terminates the handover.

The RNG-RSP message includes a TEK for encryption of traffic data to be transmitted between the SS and the target BS. Accordingly, after the termination of the handover, the SS and the BS may encrypt traffic data using the TEK and exchange the encrypted traffic data. However, the SS and the BS may not transmit encrypted traffic data until the SS receives the RNG-RSP message and decrypts the TEK.

In addition, since the RNG-RSP message includes a variety of information, such as Connection IDentification (CID) information necessary for transmission/reception of traffic data, in addition to the TEK, the transmission/reception of traffic data may not be carried out until the RNG-RSP message is received at the SS.

Therefore, a need exists for a data encryption method and system in a wireless communication system that prevents a change in a TEK.

SUMMARY OF THE INVENTION

An aspect of the present invention is to address at least the above-mentioned problems and/or disadvantages and to provide at least the advantages described below. Accordingly, an aspect of the present invention is to provide a method and system for encrypting data in a wireless communication system.

Another aspect of the present invention is to provide a data encryption method and system for preventing traffic delays due to TEK exchange during handover in a wireless communication system.

Another aspect of the present invention is to provide a data encryption method and system for preventing an unintended change in TEK due to update of an authentication key in a wireless communication system.

In accordance with an aspect of the present invention, a method for encrypting data in a wireless communication system is provided. The method includes generating, by a first node, a first encryption key using a plurality of encryption key parameters when performing authentication with a second node, wherein the first node changes a second parameter among the plurality of encryption key parameters to generate a second encryption key being identical to the first encryption key if a first parameter among the plurality of encryption key parameters is changed during re-authentication between the first node and the second node, and generates the second encryption key using the changed first parameter and the changed second parameter, and encrypts data to be transmitted to the second node using the second encryption key.

In accordance with another aspect of the present invention, a system for encrypting data in a wireless communication system is provided. The system includes a first node and a second node. The first node generates a first encryption key using a plurality of encryption key parameters when performing authentication with the second node, changes a second parameter among the plurality of encryption key parameters to generate a second encryption key being identical to the first encryption key if a first parameter among the plurality of encryption key parameters is changed during re-authentication with the first node, generates the second encryption key using the changed first parameter and the changed second parameter, and encrypts data to be transmitted to the second node using the second encryption key.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and system for encrypting data in a wireless communication system, for example, a high-speed wireless communication system such as an Institute of Electrical and Electronics Engineers IEEE 802.16e standard communication system. More specifically, the exemplary embodiments of the present invention relates to a technology for guaranteeing confidentiality of data transmitted between a Base Station (BS) and a Subscriber Station (SS) in a wireless communication system, and more particularly, to a system for performing data encryption to transmit traffic data exchanged between the SS and the BS without leakage to the outside, and a method for generating and updating a Traffic Encryption Key (TEK) used for encryption of data.

A wireless communication system according to an exemplary embodiment of the present invention will be described below with reference to FIG. 1.

Figure 1:
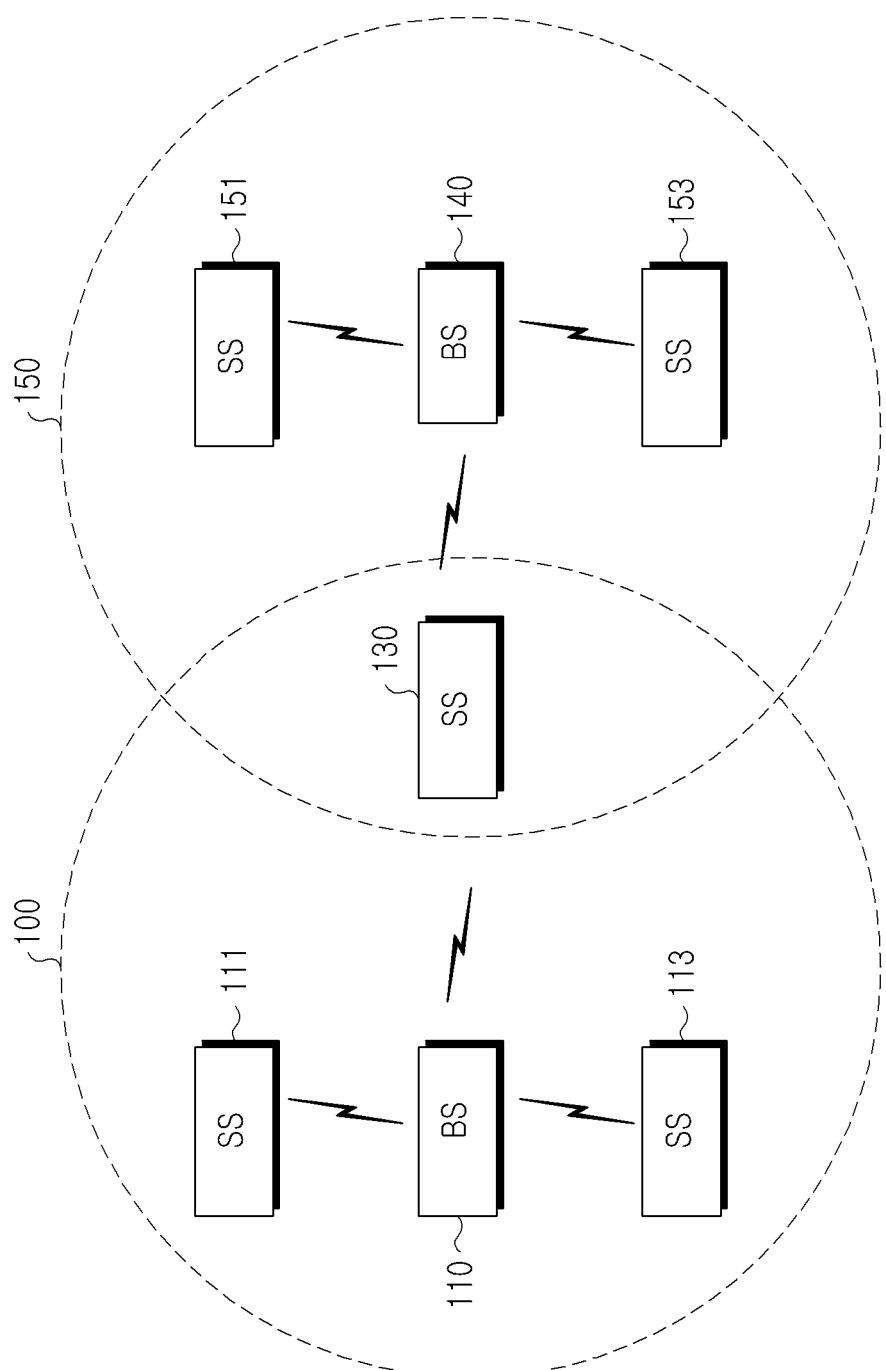
FIG. 1 is a diagram illustrating a configuration of a wireless communication system according to an exemplary embodiment of the present invention.

FIG. 1 is a diagram illustrating a configuration of a wireless communication system according to an exemplary embodiment of the present invention.

Referring to FIG. 1, the wireless communication system having a multi-cell structure includes a cell 100, a cell 150, a BS 110 in charge of the cell 100, a BS 140 in charge of the cell 150, and a plurality of SSs 111, 113, 130, 151 and 153. Although one BS may take charge of a plurality of cells, it will be assumed herein for convenience that one BS takes charge of only one cell. Among the SSs 111, 113, 130, 151 and 153, the SS 130 exists in a boundary region or a handover region between the cell 100 and the cell 150. That is, if the SS 130 moves towards the cell 150 controlled by the BS 140 while exchanging signals with the BS 110, the serving BS of the SS 130 is changed from the BS 110 to the BS 140.

Meanwhile, in the wireless communication system, each of the SSs 111, 113, 130, 151 and 153 is required to be authenticated whether it is an authorized SS capable of receiving a service from its associated BS. Each SS may be authenticated by its associated BS, and each SS and its BS may perform mutual authentication. After completion of the authentication, transmission/reception of traffic data between each SS and its BS is possible. The traffic data is transmitted and received through a TEK-based encryption process.

Meanwhile, an authentication key is generated after completion of the authentication, and the authentication key may be generated in various ways such as in a BS and transmitted to an SS.

An exemplary method for generating a TEK using an authentication key generated after completion of authentication between an SS and a BS will be described below. In this method, the SS and the BS generate a TEK using parameters such as an authentication key and a counter value. The counter value increases step by step according to the same rule in each of the SS and the BS. More specifically, the SS and the BS use the following equation (1) to generate a TEK.

$$TEK=f(\text{authentication key, counter value, other parameters}) \quad (1)$$

In accordance with the above method, even though the BS does not transmit the TEK to the SS, the TEK may be generated in each of the SS and the BS using the parameters (e.g., an authentication key, a counter value, and the like) shared between the SS and the BS. Therefore, delay for TEK sharing may not occur during handover.

Meanwhile, two TEKs always exist between the BS and the SS in order to prevent the transmission/reception of the traffic data from being interrupted due to expiry of a timer for using the TEK. Accordingly, even though any one of the two TEKs is used, the BS and the SS should be able to decrypt encrypted traffic data.

As shown in equation (1), the TEK is generated using an authentication key and a counter value, so a change in the authentication key and/or the counter value may result in a change in the TEK. The counter value may be changed when handover occurs, or the SS transitions from an idle state to an awake state.

If the counter value increases, the TEK may be updated to a new TEK, and the TEK having a lower counter value may be deleted. Thus, despite the increase of the counter value, the SS and the BS may manage only two TEKs.

Even though the counter value remains unchanged, the TEK may be changed if the authentication key is changed. The authentication key may be changed right after re-authentication, and the re-authentication is periodically performed between the SS and the BS, and may be carried out during the transmission of traffic data.

After the authentication key is updated, the SS acquires the updated authentication key by communicating with the BS to update the TEK. The number of updated TEKs is two, and despite the update of the TEKs, two original TEKs, which were previously used, may be continuously used due to the delay caused by Hybrid Automatic Retransmit Request (HARQ), and the like.

Therefore, if re-authentication is performed, the SS and the BS should decrypt traffic data using four TEKs undesirably. In this case, if the SS and the BS do not use four TEKs, a decryption error may occur during re-authentication.

Meanwhile, as described above, in the wireless communication system, the BS and the SS each use two TEKs. The two TEKs include a $TEK_{DLE}$ that a BS uses for encryption of downlink data, and a $TEK_{ULE}$ that an SS uses for encryption of uplink data. The $TEK_{DLE}$ and $TKE_{ULE}$ may be updated by any one of a Packet Number (PN)-based TEK update method, a timer-based TEK update method, and a BS-controlled TEK update method, which are used for update of downlink data or uplink data (The PN-based TEK update method updates the $TEK_{DLE}$ and the $TEK_{ULE}$ according to whether a packet number used when encrypting traffic data using the $TEK_{DLE}$ or the $TEK_{ULE}$ is greater than a preset threshold number. The packet number is set to correspond to the traffic data encrypted by the $TEK_{DLE}$ or the $TEK_{ULE}$, and a packet number 1 may be set for the first encrypted traffic data. The packet number increases by one whenever the traffic data is encrypted and transmitted.

The timer-based TEK update method updates the $TEK_{DLE}$ and the $TEK_{ULE}$ according to whether or not a timer indicating a used time of the $TEK_{DLE}$ and the $TEK_{ULE}$ has expired.

In the BS-controlled TEK update method, if the TEK needs to be updated, the BS changes the $TEK_{ULE}$ to the $TEK_{DLE}$, inducing the SS to update the TEK. For example, if there is a need to update the $TEK_{ULE}$ and the $TEK_{DLE}$ due to a decryption error, the BS may induce the SS to update the $TEK_{ULE}$ and the $TEK_{DLE}$.

More specifically, the BS updates the $TEK_{DLE}$ by changing the $TEK_{ULE}$ to the $TEK_{DLE}$, and encrypts downlink data using the updated $TEK_{DLE}$ before transmission. Upon receiving the downlink data, the SS may indirectly know that the TEK has been changed in the BS, if a decryption error of the downlink data occurs due to use of the previous $TEK_{DLE}$, or information of, for example, $TEK_{ULE}$=TEK 1, is included in the downlink data. Then, the SS may perform the TEK update with the BS according to a preset TEK change rule.

The TEK update methods include similar processes except for the process of determining whether to perform the TEK update.

A PN-based TEK update method among the TEK update methods will be described below.

Figure 2:
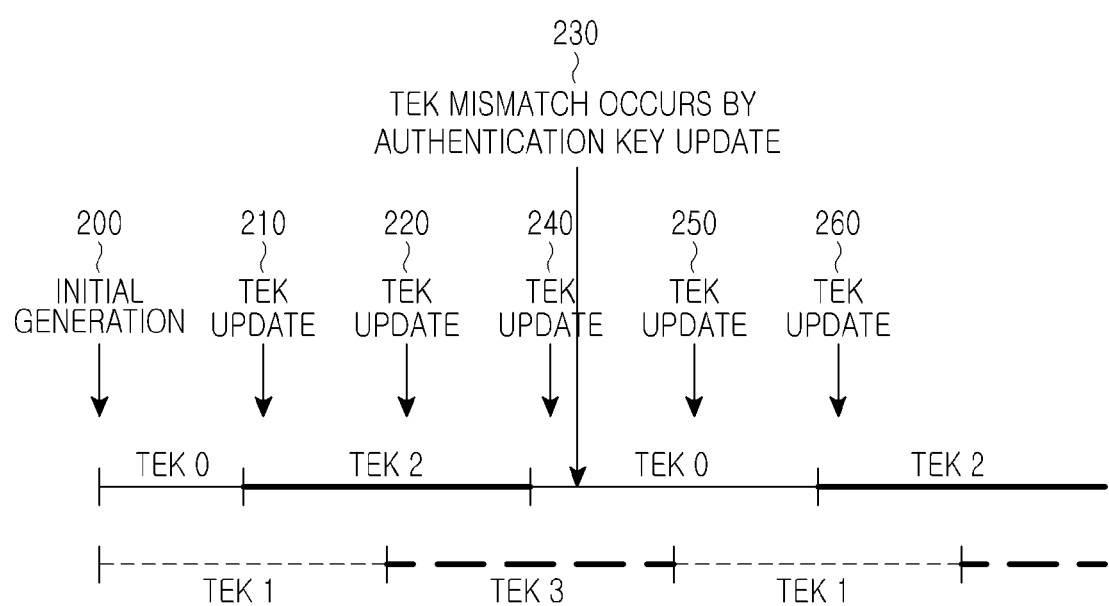
FIG. 2 is a timing diagram illustrating occurrence of Traffic Encryption Key (TEK) mismatch due to an update of an authentication key according to an exemplary embodiment of the present invention.

FIG. 2 is a timing diagram illustrating occurrence of TEK mismatch due to an update of an authentication key according to an exemplary embodiment of the present invention.

Referring to FIG. 2, a BS and an SS use a TEK 0 and a TEK 1 as a $TEK_{DLE}$ and a $TEK_{ULE}$, respectively, at an initial time 200. If a packet number of traffic data encrypted by the TEK 0 or the TEK 1 is greater than a threshold number, the BS generates a TEK 2 and deletes the TEK 0. The BS sets the generated TEK 2 as a $TEK_{ULE}$, and sets the TEK 1, or the previously used $TEK_{ULE}$, as a $TEK_{DLE}$.

Thus, the $TEK_{DLE}$ and $TEK_{ULE}$ used in the BS are updated to a TEK 1 and a TEK 2, respectively. At this moment, the $TEK_{DLE}$ and $TEK_{ULE}$ (i.e., the TEK 1 and TEK 2) of the BS are different from the $TEK_{DLE}$ and $TEK_{ULE}$ (i.e., the TEK 0 and TEK 1) of the SS, and both the downlink data and uplink data are encrypted by the TEK 1 and transmitted.

Meanwhile, the SS determines whether the $TEK_{DLE}$ for encrypting downlink data has been updated (e.g., whether the $TEK_{ULE}$ has been changed to the $TEK_{DLE}$). If a decryption error has occurred in the downlink data, the SS may determine that the $TEK_{DLE}$ has been updated. Otherwise, based on the $TEK_{DLE}$ update information (e.g., information indicating that the $TEK_{DLE}$ has been updated to the TEK 1) included in the downlink data, the SS may determine that the $TEK_{DLE}$ has been updated.

Determining that the $TEK_{DLE}$ has been updated, the SS updates the $TEK_{DLE}$ at a time 210. Similar to the BS, the SS sets the TEK 1, or the previously used $TEK_{ULE}$, as the $TEK_{DLE}$. Subsequently, the SS updates the $TEK_{ULE}$ based on the $TEK_{ULE}$ update information (e.g., information indicating that the $TEK_{ULE}$ has been updated to the TEK 2) included in the downlink data. Similarly in the BS, the $TEK_{DLE}$ and $TEK_{ULE}$ used in the SS are updated to the TEK 1 and the TEK 2, respectively.

If a packet number for the TEK 1 or the TEK 2 is greater than a threshold number, the BS generates a TEK 3, sets the generated TEK 3 as a $TEK_{ULE}$, and sets the TEK 2, or the previously used $TEK_{ULE}$, as a $TEK_{DLE}$. As a result, the $TEK_{DLE}$ and the $TEK_{ULE}$ used in the BS are updated to the TEK 2 and the TEK 3, respectively.

Based on the downlink data, if the $TEK_{DLE}$ has been updated, the SS sets the TEK 2, or the previously used $TEK_{ULE}$, as a $TEK_{DLE}$. Based on the $TEK_{ULE}$ update information included in the downlink data, the SS updates the $TEK_{ULE}$ from the TEK 2 to the TEK 3 at a time 220. As a result, the $TEK_{DLE}$ and $TEK_{ULE}$ used in the SS are updated to the TEK 2 and the TEK 3, respectively.

Meanwhile, for re-authentication, authentication keys of the BS and the SS may be changed at a time 230. In this case, due to the change in the authentication key, the $TEK_{DLE}$ and the $TEK_{ULE}$ may also be changed. That is, the TEK 2 and the TEK 3 used in the SS and the BS after update of the authentication keys are identical only in name to the TEK 2 and the TEK 3 which were first used in the SS and the BS before the update of the authentication keys, and have completely different values generated with different parameter values.

The BS and the SS are different in terms of the time where they may use the updated authentication keys. That is, even though an authentication key is generated and then the TEK is updated in the BS, the SS cannot use the existing TEK until it receives the updated authentication key. Therefore, after the authentication key is updated, the BS should manage the two originally used TEKs and the two updated TEKs until the SS updates the TEKs.

Even though the TEKs are updated in both the BS and the SS, if the authentication keys are changed again while the TEKs are updated at times 240, 250 and 260, the four TEKs should be managed undesirably in a repeated manner.

Accordingly, if a new TEK is generated due to an update of an authentication key, since it is impossible for the existing TEK to be immediately changed to a new TEK, the SS and the BS should temporarily manage four TEKs during re-authentication. Therefore, there is a need for a method for preventing TEKs from being changed despite the re-authentication process.

An exemplary method for preventing a TEK from being changed despite a change in authentication key in a wireless communication system will be described below.

First, a TEK generation and sharing method in a case of initial access to a BS by an SS will be described below with reference to FIG. 3.

Figure 3:
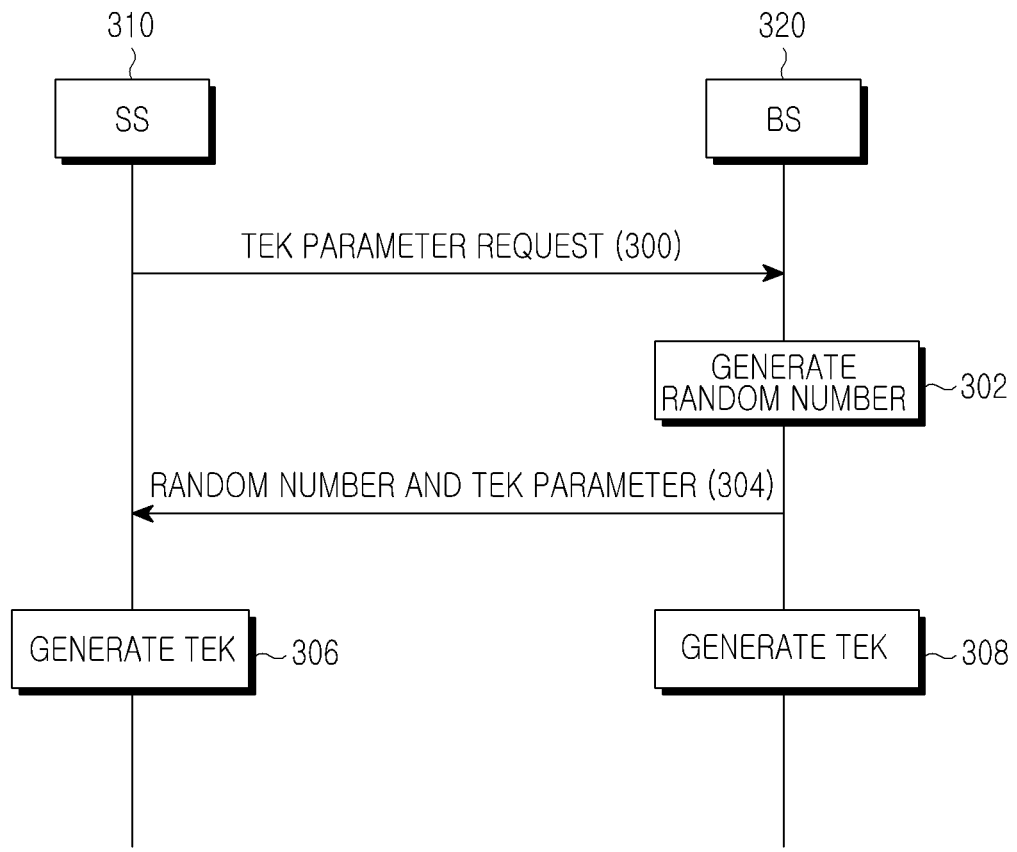
FIG. 3 is a signaling diagram illustrating a TEK generation and sharing process in a case of initial access to a Base Station (BS) by a Subscriber Station (SS) according to an exemplary embodiment of the present invention.

FIG. 3 is a signaling diagram illustrating a TEK generation and sharing process in a case of initial access to a BS by an SS according to an exemplary embodiment of the present invention.

Referring to FIG. 3, an SS 310 requests a BS 320 to provide TEK parameters, information necessary for TEK generation, in step 300. The TEK parameters may include an authentication key, a random number, and the like, and details of the TEK parameters will be described below in more detail.

Upon receiving the request, the BS 320 generate a random number in step 302, and transmits the generated random number and the other TEK parameters to the SS 310 as TEK parameters in step 304. Accordingly, the SS 310 and the BS 320 each may acquire the TEK parameters. The SS 310 and the BS 320 generate TEKs using the TEK parameters in steps 306 and 308, respectively.

Each of the SS 310 and the BS 320 generates TEKs using the TEK generation functions defined in equation (2).

$$TEK_{old}=Dot16KDF(AK\ XOR\ RandomOld, SS\ MAC\ Address|SAID|BSID|Counter_{old})$$

$$TEK_{new}=Dot16KDF(AK\ XOR\ RandomNew, SS\ MAC\ Address|SAID|BSID|Counter_{new}) \quad (2)$$

where $TEK_{old}$ denotes a TEK ($TEK_{DLE}$) used for encryption of downlink data, $TEK_{new}$ denotes a TEK ($TEK_{ULE}$) used for encryption of uplink data, Dot16Key Derivation Function (KDF) denotes a function for generating the $TEK_{old}$ and the $TEK_{new}$, AK denotes an Authentication Key (or Authorization Key) generated during authentication, RandomOld denotes a random number for generating the $TEK_{old}$, RandomNew denotes a random number for generating the $TEK_{new}$, and $Counter_{old}$ and $Counter_{new}$ denote counter values for identifying the $TEK_{old}$ and the $TEK_{new}$, respectively.

In addition, XOR denotes Exclusive OR, SS MAC Address denotes an identifier of an SS, SAID denotes a Security Association IDentity, and a BSID denotes an identifier of a BS. In equation (2), the SS MAC Address, the SAID and the BSID are always set to the same values unless the SS and the BS are changed.

While, in the process of FIG. 3, the random number generated in the BS 320 is transmitted to the SS 310 along with other TEK parameters, a random number generated in the SS 310 may be transmitted to the BS 320 along with the TEK parameters. After completion of the authentication process between the BS 320 and the SS 310, the TEK parameters may be exchanged or shared without a request and response process.

On the other hand, the BS 320 or the SS 310 may transmit some TEK parameters to another entity to enable it to generate TEKs, instead of unilaterally transmitting all the TEK parameters as illustrated in FIG. 3.

More specifically, when transmitting TEK parameters, the SS 310 transmits not all, but some of the TEK parameters to the BS 320. For example, some TEK parameters transmitted from the SS 310 may include the SS MAC Address and the SAID. Also, some of the TEK parameters may include other parameters defined in advance between the BS 320 and the SS 310.

Upon receiving only some of the TEK parameters from the SS 310, the BS 320 transmits the remaining TEK parameters except for some of the received TEK parameters to the SS 310. For example, the remaining TEK parameters transmitted by the BS 320 may include the BSID and the RandomOld or the RandomNew, except for the SS MAC Address and the SAID.

If the SS 310 and the BS 320 already have specific TEK parameters, transmission/reception of the TEK parameters may be omitted. If the TEK parameters are not transmitted and received, TEK parameters with preset values may be used.

If the above processes are completed, the BS 320 and the SS 310 each may acquire all the TEK parameters using their own TEK parameters and the received TEK parameters. Accordingly, the BS 320 and the SS 310 each generate TEKs using all the acquired TEK parameters. The TEKs may be generated using equation (2) above.

The above-described TEK generation and sharing method is performed not through the transmission/reception of TEKs, but the through transmission/reception of TEK parameters for generation of the TEKs. Accordingly, the risk of TEK leakage, which may occur when TEKs are directly transmitted and received, is reduced, ensuring higher security between the BS and the SS.

A TEK update method according to an exemplary embodiment of the present invention will be described below with reference to FIG. 4. The process of FIG. 4 may be performed after completion of the process of FIG. 3.

Figure 4:
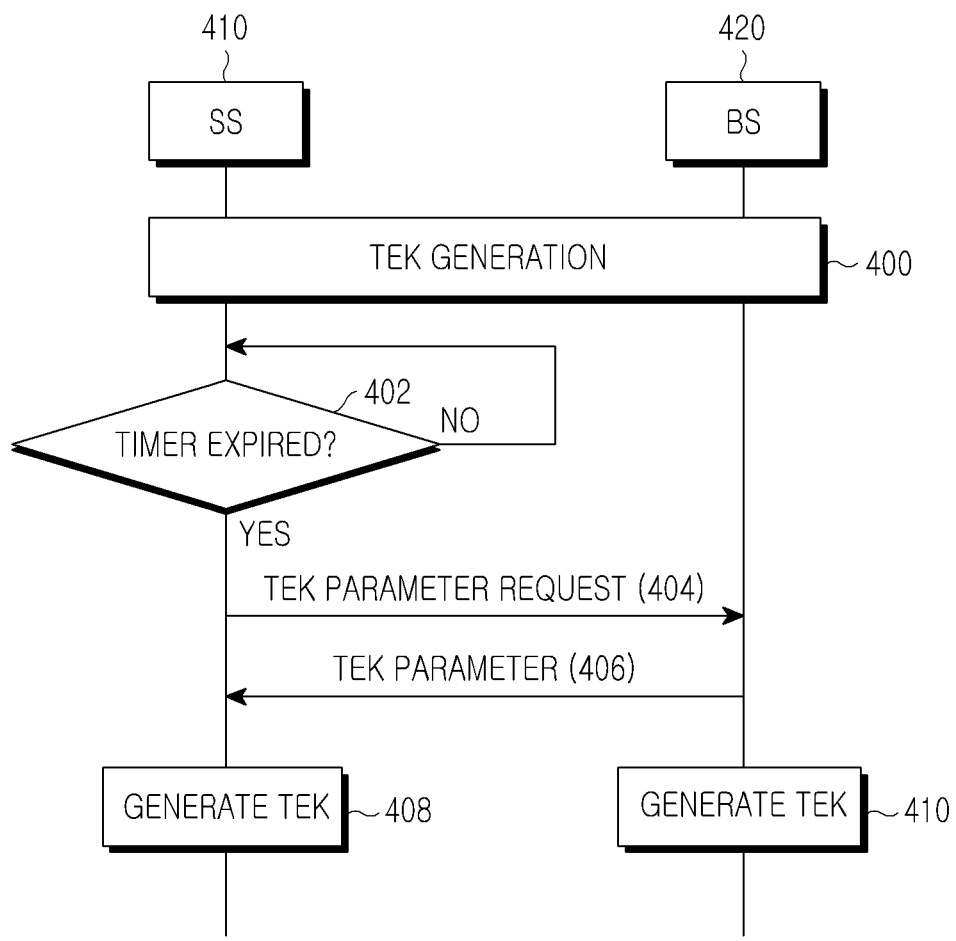
FIG. 4 is a signaling diagram illustrating a process of updating a TEK in a wireless communication system according to an exemplary embodiment of the present invention.

FIG. 4 is a signaling diagram illustrating a process of updating a TEK in a wireless communication system according to an exemplary embodiment of the present invention.

Referring to FIG. 4, an SS 410 and a BS 420 each generate TEKs in step 400. The SS 410 determines in step 402 whether an event for TEK update has occurred. The event may occur, for example, when a timer for the generated TEK has expired. The timer is used to determine whether the time, for which use of the TEK is available, has expired. While the SS 410 determines the expiry/non-expiry of the timer in FIG. 4, it is also possible for the BS 420 to determine the expiry/non-expiry of the timer.

Upon detecting the expiry of the timer, the SS 410 transmits a request for TEK parameters necessary for TEK update to the BS 420 in step 404. In response to the request, the BS 420 transmits TEK parameters to the SS 410 in step 406.

Alternatively, if the timer has expired, the BS 420 may immediately transmit all the TEK parameters to the SS 410 without receiving the request.

In accordance with the above process, the BS 420 and the SS 410 each may generate new TEKs using all the TEK parameters. The TEKs may be generated using equation (2) above. The generated new TEKs may be updated to TEKs to be newly used.

Upon acquiring the TEK parameters necessary for TEK update through the above process, the SS 410 and the BS 420 generate new TEKs using the TEK parameters and update the generated TEKs to TEKs to be newly used, in steps 408 and 410, respectively.

Accordingly, the BS 420 or the SS 410 may unilaterally transmit the TEK parameters necessary for the TEK update. In an alternative example, however, it is also possible to update TEKs by transmitting not all, but some of the TEK parameters.

More specifically, if an event for TEK update occurs in the BS 420 or the SS 410, the following process may be performed.

Although a similar process may be performed in both a case where an event for TEK update occurs in the BS 420 and another case where an event for TEK update occurs in the SS 410, it will be assumed herein that the event for TEK update occurs in the SS 410.

The SS 410 transmits some of the TEK parameters to the BS 420. That is, the SS 410 transmits to the BS 420 the remaining TEK parameters except for the TEK parameters it already shares with the BS 420. For example, the TEK parameters transmitted by the SS 410 may include an SS MAC Address and an SAID. It will be understood by those of ordinary skill in the art that the TEK parameters transmitted by the SS 410 may include other parameters defined in advance between the BS 420 and the SS 410.

Upon receiving only some of the TEK parameters from the SS 410, the BS 420 transmits the remaining TEK parameters except for the received TEK parameters, to the SS 410. For example, the TEK parameters transmitted by the BS 420 may include a BSID and a RandomOld or a RandomNew, except for the SS MAC Address and the SAID.

After completion of the above process, the BS 420 and the SS 410 each may acquire all TEK parameters using their own TEK parameters and the received TEK parameters.

Meanwhile, the BS 420 and the SS 410 may update TEKs without transmitting and receiving TEK parameters. If an event for the TEK update occurs in the BS 420 or the SS 410, the following process may be performed.

Although a similar process may be performed in both a case where an event for TEK update occurs in the BS 420 and another case where an event for TEK update occurs in the SS 410, it will be assumed herein that the event for TEK update occurs in the SS 410.

The SS 410 transmits to the BS 420 a notification message notifying that the TEK parameters have been changed or are to be changed. Then the BS 420 receives TEK parameter change information included in the notification message, and then transmits an Acknowledgement (ACK) message for the notification message to the SS 410.

After completion of the exchange of the Notification-ACK messages, the BS 420 and the SS 410 change the TEK parameters to correspond to the TEK parameter change information.

After completion of the change of the TEK parameters, the BS 420 and the SS 410 each generate TEKs using the TEK parameters and update the generated TEKs to TEKs to be newly used.

Now, a TEK generation method during handover according to an exemplary embodiment of the present invention will be described below with reference to FIG. 5.

Figure 5:
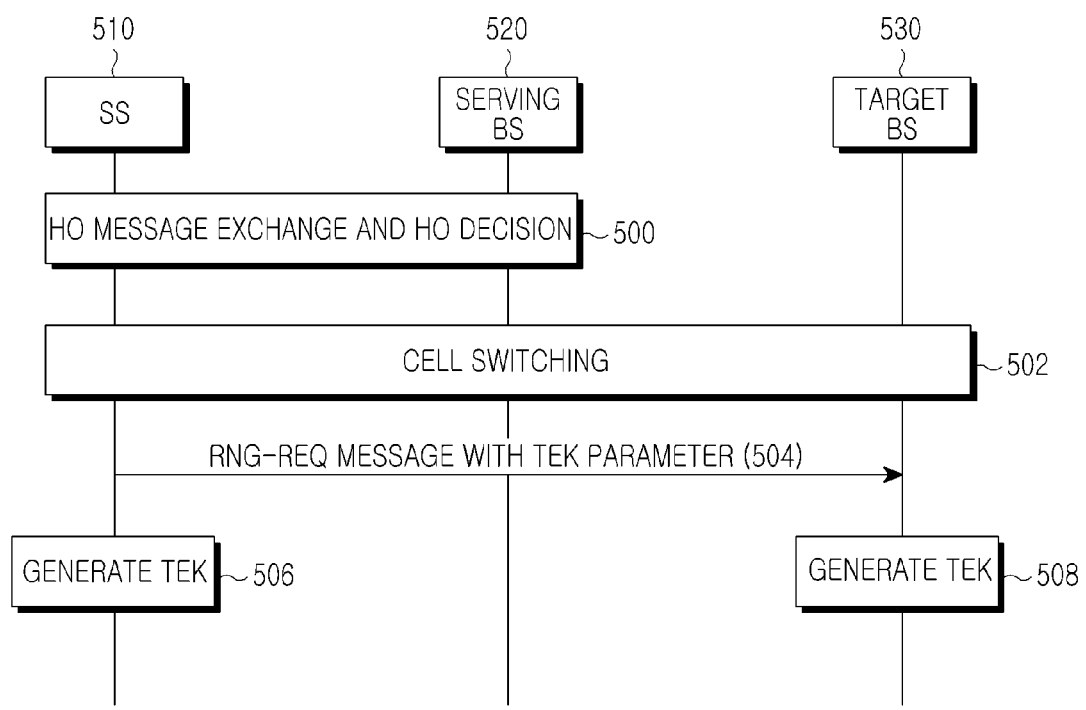
FIG. 5 is a signaling diagram illustrating a process of generating a TEK during handover in a wireless communication system according to an exemplary embodiment of the present invention.

FIG. 5 is a signaling diagram illustrating a process of generating a TEK during handover in a wireless communication system according to an exemplary embodiment of the present invention.

Referring to FIG. 5, an SS 510 exchanges HandOver (HO) messages with a serving BS 520 to perform handover, and decides a handover to a target BS 530, in step 500. The SS 510 may acquire a BSID of the target BS 530 from the handover messages.

After the handover decision, the SS 510 cell switches to the target BS 530 in step 502.

In this case, the SS 510 needs to receive an authentication key from the target BS 530. The SS 510 may identify an authentication key corresponding to the target BS 530 among pre-stored authentication keys, since it has determined and stored authentication keys corresponding to respective BSs in advance.

In step 504, the SS 510 transmits an RNG-REQ message to the target BS 530. The RNG-REQ message may include TEK parameters. The TEK parameters in the RNG-REQ message may include, for example, a counter value and the TEK parameters the SS 510 has used for communication with the serving BS 520.

As described above, the counter value increases during handover, and may be set by a Cipher-based Message Authentication Code (CMAC) key count, and the like. The TEK parameters the SS 510 has used for communication with the serving BS 520, may include the values, which are not changed regardless of the handover, such as an SS MAC Address and an SAID.

The SS 510 and the target BS 530 each may acquire the TEK parameters through the above process.

Therefore, the SS 510 and the target BS 530 may generate TEKs using the acquired TEK parameters in steps 506 and 508, respectively, regardless of the transmission/reception of an RNG-RSP message.

Through the above process, the present invention may prevent the delay caused by TEK sharing during handover and may also prevent the transmission/reception of traffic data from being interrupted by the reception of the RNG-RSP message.

A TEK update method during re-authentication of an SS and a BS according to an exemplary embodiment of the present invention will be described below with reference to FIG. 6.

Figure 6:
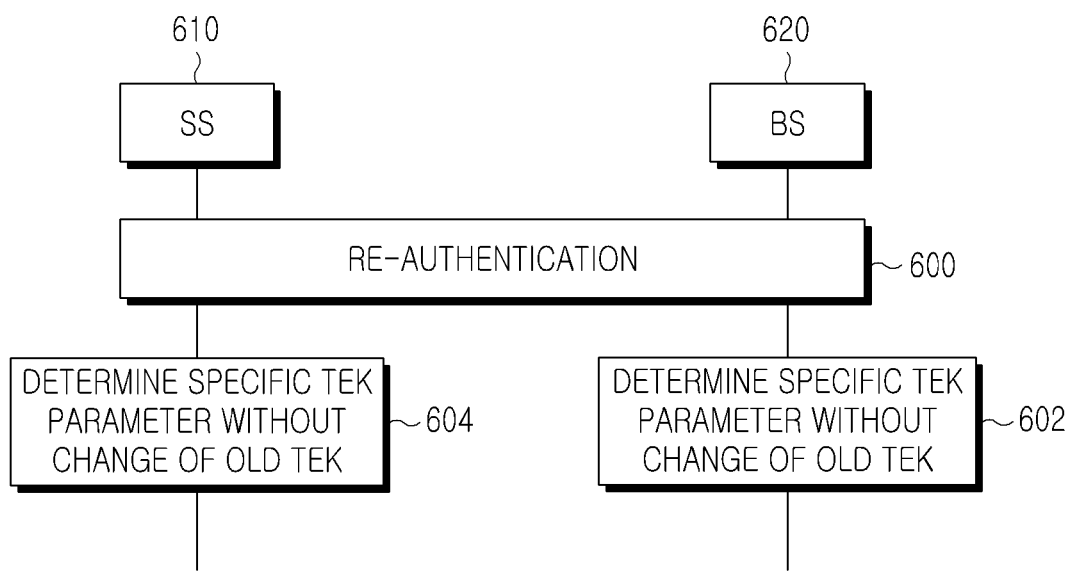
FIG. 6 is a signaling diagram illustrating a process of updating a TEK during re-authentication of an SS and a BS in a wireless communication system according to an exemplary embodiment of the present invention.

FIG. 6 is a signaling diagram illustrating a process of updating a TEK during re-authentication of an SS and a BS in a wireless communication system according to an exemplary embodiment of the present invention.

Referring to FIG. 6, an SS 610 and a BS 620 perform a re-authentication process in step 600. The re-authentication process may be periodically performed to improve security. The BS 620 may re-authenticate the SS 610, or the BS 620 and the SS 610 may perform mutual re-authentication.

After completion of the re-authentication process, the SS 610 and the BS 620 generate a new authentication key. The SS 610 and the BS 620 may generate new TEKs using the new authentication key, and the SS 610 and the BS 620 are different in terms of the time at which the new TEKs are used. This is because even though a new authentication key is generated in both the SS 610 and the BS 620, the BS 620 and the SS 610 does not know the generation of the new authentication key in each other until traffic data encrypted by the new TEKs are transmitted and received.

Due to the difference between the SS 610 and the BS 620 in terms of the time at which the new authentication key is used, and the retransmission of the encrypted traffic data, a difference between the SS 610 and the BS 620 occurs in terms of the time at which the newly generated TEKs are used. In this case, the SS 610 and the BS 620 each should temporarily manage both the changed TEKs and the previously used TEKs.

Therefore, in step 602, the BS 620 determines specific TEK parameters such that the previously used TEKs are not changed despite the change in the authentication key. Also, after the re-authentication, the SS 610 determines, in step 604, specific TEK parameters such that the previously used TEKs are not changed. The BS 620 and the SS 610 may then generate the same TEKs as the previously used TEKs using the determined specific TEK parameters despite the change in the authentication key. As a result, the SS 610 may perform normal communication with the BS 620 even though it is not the same as the BS 620 in terms of the time at which the new TEKs are used.

In steps 602 and 604, the process described below is performed.

First, it will be assumed herein that two TEKs used before the re-authentication are generated using equation (3) below.

$$TEK_a = f_a(\text{authentication key}, RandomNo1, \text{other parameters}),$$

$$TEK_b = f_b(\text{authentication key}, RandomNo2, \text{other parameters}) \quad (3)$$

where $TEK_a$ and $TEK_b$ denote two TEKs which are distinguished based on their expiry time, $f_a$ and $f_b$ denote functions for generating TEKs, RandomNo1 denotes a random number for generating the $TEK_a$, and RandomNo2 denotes a random number for generating the $TEK_b$.

If the TEKs are generated in accordance with equation (3), other TEK parameters except for the authentication key are determined using equation (4) below so that TEKs are not changed despite the update of the authentication key. It is assumed in equation (4) that RandomNo1 and RandomNo2 in equation (3) are determined.

$$\begin{aligned} TEK_a &= f_a(\text{authentication key}, RandomNo1, \text{other parameters}) \\ &= f_a(\text{new authentication key}, \underline{determined\ RandomNo1}, \text{other parameters}) \end{aligned}$$

$$\begin{aligned} TEK_b &= f_b(\text{authentication key}, RandomNo2, \text{other parameters}) \\ &= f_b(\text{new authentication key}, \underline{determined\ RandomNo2}, \text{other parameters}) \end{aligned} \quad (4)$$

Various functions may be used to change specific TEK parameters so that TEKs are not changed despite the change in the authentication key. For example, a function may be used, which determines change values ("determined RandomNo1" and "determined RandomNo2" in equation (4)) of specific TEK parameters using the TEKs, which are result values, and the remaining TEK parameters.

Also, a function may be used, which provides an association relationship between an authentication key or a specific key derived from the authentication key and the specific TEK parameters. For example, in a case where the TEK parameter RandomNo1 is changed, if "authentication key XOR RandomNo1" replaces "RandomNo1" as a parameter in the function for generating the TEK, "determined RandomNo1" may be easily determined despite the change in the authentication key.

A process of changing specific TEK parameters to prevent the change in TEK during re-authentication will be described below in a case where two TEKs used before the re-authentication are generated using equation (5) below.

$$TEK_{old} = Dot16KDF(AK\ XOR\ RandomOld, SS\ MAC\ Address|SAID|BSID|Counter_{old})$$

$$TEK_{new} = Dot16KDF(AK\ XOR\ RandomNew, SS\ MAC\ Address|SAID|BSID|Counter_{new}) \quad (5)$$

Equation (5) is the same as above-described equation (2), so its detailed description will be omitted.

If the re-authentication process is performed, an AK is updated to AK' in equation (5), which is a new authentication key. If the AK is updated, $TEK_{old}$ and $TEK_{new}$ are changed. To prevent the change, RandomOld and RandomNew are updated to RandomOld' and RandomNew', respectively, as shown in equation (6) below.

$$RandomOld' = (AK\ XOR\ RandomOld) XOR\ AK'$$

$$RandomNew' = (AK\ XOR\ RandomNew) XOR\ AK' \quad (6)$$

If RandomOld' and RandomNew' are substituted in equation (5), the TEKs are defined as equation (7) below.

$$TEK_{old} = Dot16KDF(AK'\ XOR\ RandomOld', SS\ MAC\ Address|SAID|BSID|Counter_{old})$$

$$TEK_{new} = Dot16KDF(AK'\ XOR\ RandomNew', SS\ MAC\ Address|SAID|BSID|Counter_{new}) \quad (7)$$

AK XOR RandomOld=AK' XOR RandomOld', and AK XOR RandomNew=AK' XOR RandomNew'. Therefore, even though AK is updated to AK', the $TEK_{old}$ and $TEK_{new}$ may maintain their values without change.

Meanwhile, in an alternative example, an SS and a BS may generate TEKs using TEK generation functions shown in equation (8) below.

$$TEK_i = Dot16KDF(AK_{old}\ XOR\ TEK\_ADJ_i; SAID|COUNTER\_TEK=i|\text{"TEK"},128)$$

$$TEK_{i+1} = Dot16KDF(AK_{old}\ XOR\ TEK\_ADJ_{i+1}, SAID|COUNTER\_TEK=i+1|\text{"TEK"},128) \quad (8)$$

where $TEK_i$ denotes a TEK ($TEK_{DLE}$) used for encryption of downlink data, $TEK_{i+1}$ denotes a TEK ($TEK_{ULE}$) used for encryption of uplink data, Dot16KDF denotes a function for generating $TEK_i$ and $TEK_{i+1}$, and $AK_{old}$ denotes an authentication key generated in an authentication process.

In addition, COUNTER_TEK=i and COUNTER_TEK=i+1 denote counter values for identifying the $TEK_i$ and $TEK_{i+1}$, respectively, and "TEK", and 128 indicates that the $TEK_i$ and $TEK_{i+1}$ have a length of 128 bits.

$TEK\_ADJ_i$ and $TEK\_ADJ_{i+1}$ have the same length as the $AK_{old}$, and represent adjustment values for maintaining values of the $TEK_i$ and the $TEK_{i+1}$ based on the value of $AK_{old}$ so that the $TEK_i$ and the $TEK_{i+1}$ are not changed despite the re-authentication. When the $TEK_i$ and the $TEK_{i+1}$ are first generated, the $TEK\_ADJ_i$ and $TEK\_ADJ_{i+1}$ are set to '0', and are updated in a BS and an SS in accordance with equation (9) below during re-authentication.

$$TEK\_ADJ_{i\_updated} = AK_{new} \text{ XOR } AK_{old} \text{ XOR } TEK\_ADJ_i$$

$$TEK\_ADJ_{i+1\_updated} = AK_{new} \text{ XOR } AK_{old} \text{ XOR } TEK\_ADJ_{i+1} \quad (9)$$

where $TEK\_ADJ_{i\_updated}$ and $TEK\_ADJ_{i+1\_updated}$ denote $TEK\_ADJ_i$ and $TEK\_ADJ_{i+1}$, respectively, which are updated by the re-authentication. In addition, $AK_{new}$ denotes a newly updated authentication key, and $AK_{old}$ denotes a previously used authentication key.

During re-authentication, the BS and the SS determine the $TEK_i$ and the $TEK_{i+1}$ using the $TEK\_ADJ_{i\_updated}$ and the $TEK\_ADJ_{i+1\_updated}$, resulting in equation (10) below.

$$\begin{aligned}
TEK_i &= Dot16KDF(AK_{new}\text{XORTEK\_ADJ}_{i\_updated}, SAID|COUNTER\_TEK = i|\text{"}TEK\text{"}, 128) \\
&= Dot16KDF(AK_{new}XORAK_{new}XORAK_{old}\text{XORTEK\_ADJ}_i, SAID|COUNTER\_TEK = i|\text{"}TEK\text{"}, 128) \\
&= Dot16KDF(AK_{old}\text{XORTEK\_ADJ}_i, SAID|COUNTER\_TEK = i|\text{"}TEK\text{"}, 128)
\end{aligned} \quad (10)$$

$$\begin{aligned}
TEK_{i+1} &= Dot16KDF(AK_{new}\text{XORTEK\_ADJ}_{i+1\_updated}, SAID|COUNTER\_TEK = i+1|\text{"}TEK\text{"}, 128) \\
&= Dot16KDF(AK_{new}XORAK_{new}XORAK_{old}\text{XORTEK\_ADJ}_{i+1}, SAID|COUNTER\_TEK = i+1|\text{"}TEK\text{"}, 128) \\
&= DOT16KDF(AK_{old}\text{XORTEK\_ADJ}_{i+1}, SAID|COUNTER\_TEK = i+1|\text{"}TEK\text{"}, 128)
\end{aligned}$$

As shown in equation (10), despite the re-authentication, the $TEK_i$ and $TEK_{i+1}$ are not changed because of the use of the $TEK\_ADJ_{i\_updated}$ and $TEK\_ADJ_{i+1\_updated}$.

Thus, the above-described method for preventing the change in TEK due to the re-authentication may address the TEK mismatch problem caused by an unnecessary TEK update, and is not required to manage four TEKs right after the re-authentication.

A method for exchanging or sharing a random number, i.e., one of the TEK parameters, according to an exemplary embodiment of the present invention will be described below.

In a message exchanged between an SS and a BS is added a Message Authentication Code (MAC) for message authentication before transmission. The MAC includes a counter value, and the counter value is initialized to '0' during authentication or re-authentication, and may increase when handover is performed, or when the state of the SS transitions from the idle state to the awake state.

Therefore, when a plurality of the same messages are transmitted by a BS or an SS, each of the same messages has a different MAC according to the counter value.

Meanwhile, a value of a MAC cannot be generated in the SS or the BS, if there is no separate key for generating the value. Accordingly, in an exemplary embodiment of the present invention, a random number is used as a MAC in the messages exchanged between the BS and the SS. Generally, the random number, i.e., a TEK parameter, is used to generate TEKs and the like.

However, according to an exemplary embodiment of the present invention, random numbers may be used as a MAC in messages exchanged between the BS and the SS, and a parameter for random number generation. In addition, a random number may be applied to a value-unpredictable item in a message, in addition to the MAC. In this case, the message size or the number of messages exchanged between the SS and the BS may be reduced.

As described above, the exemplary embodiments of the present invention can prevent a TEK from being changed due to the update of an authentication key, which avoids the need for a TEK update due to the re-authentication. In the exemplary embodiments of the present invention, the TEKs are not changed during re-authentication, which solves the TEK mismatch problem. After the re-authentication, only two TEKs may be managed as usual. In the exemplary embodiments of the present invention, TEK transmission from a BS to an SS is not required during handover, which reduces transmission delay of traffic data due to TEK sharing, and the parameter the SS has exchanged with a serving BS can be used even in a target BS during handover, avoiding the need for exchange of TEK parameters for handover. In addition, despite the non-exchange of TEK parameters for handover, TEKs different from the TEKs, which were used in the serving BS, can be used in the target BS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for encrypting data by a first node in a wireless communication system, the method comprising:

performing an authentication operation with a second node, by the first node, using a first encryption key generated using a plurality of encryption key parameters, the plurality of encryption key parameters including an authentication key, a first random number, and at least one of a counter value, a security association identity (SAID), a first node IDentifier (ID), and a second node ID;

changing, by the first node, the first random number to generate a second encryption key being identical to the first encryption key, if the authentication key is changed during a re-authentication operation performed between the first node and the second node;

generating, by the first node, the second encryption key using the changed authentication key, the changed first random number, and at least one of the counter value, the SAID, the first node ID and the second node ID; and encrypting, by the first node, data to be transmitted to the second node using the second encryption key.

2. The method of claim 1, wherein each of the first encryption key and the second encryption key comprises a Traffic Encryption Key (TEK).

3. The method of claim 1, wherein a use of the second encryption key is terminated if data encrypted by a third encryption key is received from the second node, and the third encryption key is generated using the changed authentication key, the first random number, and at least one of the counter value, the SAID, the first node ID and the second node ID.

4. The method of claim 1, further comprising:

transmitting, by the first node, a Ranging Request (RNG-REQ) message including the SAID, the second node ID and the counter value to a target node during handover to the target node.

5. The method of claim 1, wherein the authentication key is changed if at least one of a re-authentication operation for the second node and a mutual re-authentication operation is performed, and
wherein the re-authentication operation for the second node includes an operation that the first node re-authenticates the second node, and the mutual re-authentication operation includes an operation that the first node performs mutual re-authentication with the second node.

6. The method of claim 1, wherein the generating of the second encryption key comprises:
determining, by the first node, a first Exclusive OR (XOR) value between the authentication key and the first random number;
determining, by the first node, a second XOR value between the first XOR value and the changed authentication key, and setting the second XOR value as the changed second random number; and
generating, by the first node, the second encryption key using the changed authentication key, the second random number, and at least one of the counter value, the SAID, the first node ID and the second node ID.

7. A method for encrypting data by a first node in a wireless communication system, the method comprising:
performing an authentication operation with a second node, by the first node, using a first encryption key generated using a plurality of encryption key parameters, the plurality of encryption key parameters including an authentication key, first encryption key adjustment value determined based on the authentication key, and at least one of a counter value, a security association identity (SAID), and an encryption key length value;
changing, by the first node, the first encryption key adjustment value to generate a second encryption key being identical to the first encryption key, if the authentication key is changed during a re-authentication operation performed between the first node and the second node;
generating, by the first node, the second encryption key using the changed authentication key, a second encryption key adjustment value as the changed first encryption key adjustment value, and at least one of the counter value, the SAID, and the encryption key length value; and
encrypting, by the first node, data to be transmitted to the second node using the second encryption key.

8. The method of claim 7, wherein a use of the second encryption key is terminated if data encrypted by a third encryption key is received from the second node, and the third encryption key is generated using the changed authentication key, the first encryption key adjustment value, and at least one of the counter value, the SAID, and the encryption key length value.

9. The method of claim 7, further comprising:
transmitting, by the first node, an RNG-REQ message including the SAID and the counter value to a target node during handover from to the target node.

10. The method of claim 7, wherein the generating of the second encryption key comprises:
determining, by the first node, a first Exclusive OR (XOR) value between the authentication key and the changed authentication key;
setting, by the first node, an Exclusive OR (XOR) value between the first XOR value and the first encryption key adjustment value as the second encryption key adjustment value; and
generating, by the first node, the second encryption key using the changed authentication key, the second encryption key adjustment value, and at least one of the counter value, the SAID, and the encryption key length value.

11. The method of claim 7, wherein, if the second encryption key is one of $TEK_i$ and $TEK_{i+1}$, the second encryption key is generated using following equation:

$$TEK_i = Dot16KDF(AK_{old} \text{ XOR } TEK\_ADJ_i, SAID|COUNTER\_TEK=i|\text{"TEK"},128)$$

$$TEK_{i+1} = Dot16KDF(AK_{old} \text{ XOR } TEK\_ADJ_{i+1}, SAID|COUNTER\_TEK=i+1|\text{"TEK"},128),$$

where $TEK_i$ denotes a TEK used for encryption of downlink data, $TEK_{i+1}$ denotes a TEK used for encryption of uplink data, Dot16KDF denotes a function for generating the $TEK_i$ and the $TEK_{i+1}$, $AK_{old}$ denotes an authentication key as the first parameter, COUNTER_TEK=i and COUNTER_TEK=i+1 denote counter values for identifying the $TEK_i$ and the $TEK_{i+1}$, respectively, "TEK", 128 indicates that the $TEK_i$ and the $TEK_{i+1}$ have a length of 128 bits, and $TEK\_ADJ_i$ and $TEK\_ADJ_{i+1}$ denote encryption adjustment values for maintaining values of the $TEK_i$ and the $TEK_{i+1}$ based on a value of the $AK_{old}$, as the second parameter.

12. The method of claim 11, wherein the $TEK\_ADJ_i$ and $TEK\_ADJ_{i+1}$ are generated using the following equation:

$$TEK\_ADJ_{i\_updated} = AK_{new} \text{ XOR } AK_{old} \text{ XOR } TEK\_ADJ_i$$

$$TEK\_ADJ_{i+1\_updated} = AK_{new} \text{ XOR } AK_{old} \text{ XOR } TEK\_ADJ_{i+1}$$

where $TEK\_ADJ_{i\_updated}$ and $TEK\_ADJ_{i+1\_updated}$ denote the $TEK\_ADJ_i$ and the $TEK\_ADJ_{i+1}$ updated during the re-authentication, respectively, and $AK_{new}$ denotes the changed first parameter.

13. A first node for encrypting data in a wireless communication system, the first node comprising:
a transmitter;
a receiver; and
a controller for performing an authentication operation with a second node using a first encryption key generated using a plurality of encryption key parameters, the plurality of encryption key parameters including an authentication key, a first random number, and at least one of a counter value, a security association identity (SAID), a first node IDentifier (ID), and a second node ID, changing the first random number to generate a second encryption key being identical to the first encryption key, if the authentication key is changed during a re-authentication operation performed with the second node, generating the second encryption key using the changed authentication key, a second random number as the changed first random, and at least one of the counter value, the SAID, the first node ID and a second node ID, and encrypting data to be transmitted to the second node through the transmitter using the second encryption key.

14. The first node of claim 13, wherein each of the first encryption key and the second encryption key comprises a Traffic Encryption Key (TEK).

15. The first node of claim 13, wherein a use of the second encryption key is terminated if data encrypted by a third encryption key is received from the second node, and the third encryption key is generated using the changed authentication key, the first random number, and at least one of the counter value, the SAID, the first node ID and the second node ID.

16. The first node of claim 13, wherein the transmitter transmits a Ranging Request (RNG-REQ) message including the SAID, the second node ID and the counter value to a target node during handover to the target node.

17. The first node of claim 13, wherein the authentication key is changed if a re-authentication operation for the second node and a mutual re-authentication operation is performed, and
wherein the re-authentication operation for the second node includes an operation that the first node re-authenticates the second node, and the mutual re-authentication operation includes an operation that the first node performs mutual re-authentication with the second node.

18. The first node of claim 13, wherein the controller determines a first Exclusive OR (XOR) value between the authentication key and the first random number, determines a second XOR value between the first XOR value and the changed authentication key, sets the second XOR value as the second random number, and generates the second encryption key using the changed authentication key and the second random number, and at least one of the counter value, the SAID, the first node ID and the second node ID.

19. A first node for encrypting data in a wireless communication system, the first node comprising:
a transmitter;
a receiver; and
a controller for performing an authentication operation with a second node, by the first node, using a first encryption key generated using a plurality of encryption key parameters, the plurality of encryption key parameters including an authentication key, first encryption key adjustment value determined based on the authentication key, and at least one of a counter value, a security association identity (SAID), and an encryption key length value, changing, by the first node, the first encryption key adjustment value among the plurality of encryption key parameters to generate a second encryption key being identical to the first encryption key, if the authentication key among the plurality of encryption key parameters is changed during re-authentication between the first node and the second node, generating, by the first node, the second encryption key using the changed authentication key, a second encryption key adjustment value as the changed encryption key adjustment value, and at least one of the counter value, the SAID, and the encryption key length value, and encrypting, by the first node, data to be transmitted to the second node through the transmitter using the second encryption key.

20. The first node of claim 19, wherein a use of the second encryption key is terminated if data encrypted by a third encryption key is received from the second node, and the third encryption key is generated using the changed authentication key, the first encryption key adjustment value, and at least one of the counter value, the SAID, and the encryption key length value.

21. The first node of claim 19, wherein the transmitter transmits an RNG-REQ message including the SAID and the counter value to a target node during handover to the target node.

22. The first node of claim 19, wherein the controller determines a first Exclusive OR (XOR) value between the authentication key and the changed authentication key, sets an Exclusive OR (XOR) value between the first XOR value and the first encryption key adjustment value as the second encryption key adjustment value, and generates the second encryption key using the changed authentication key, the second encryption key adjustment value, and at least one of the counter value, the SAID, and the encryption key length value.

23. The first node of claim 13, wherein, if the second encryption key is one of $TEK_i$ and $TEK_{i+1}$, the first node generates the second encryption key using following equation:

$$TEK_i = \mathrm{Dot16KDF}(AK_{old} \text{ XOR } TEK\_ADJ_i, SAID|COUNTER\_TEK=i|\text{``TEK''},128)$$

$$TEK_{i+1} = \mathrm{Dot16KDF}(AK_{old} \text{ XOR } TEK\_ADJ_{i+1}, SAID|COUNTER\_TEK=i+1|\text{``TEK''},128),$$

where $TEK_i$ denotes a TEK used for encryption of downlink data, $TEK_{i+1}$ denotes a TEK used for encryption of uplink data, Dot16KDF denotes a function for generating the $TEK_i$ and the $TEK_{i+1}$, $AK_{old}$ denotes an authentication key as the first parameter, COUNTER_TEK=i and COUNTER_TEK=i+1 denote counter values for identifying the $TEK_i$ and the $TEK_{i+1}$, respectively, "TEK", 128 indicates that the $TEK_i$ and the $TEK_{i+1}$ have a length of 128 bits, and $TEK\_ADJ_i$ and $TEK\_ADJ_{i+1}$ denote encryption adjustment values for maintaining values of the $TEK_i$ and the $TEK_{i+1}$ based on a value of the $AK_{old}$, as the second parameter.

24. The first node of claim 23, wherein the $TEK\_ADJ_i$ and the $TEK\_ADJ_{i+1}$ are generated using the following equation:

$$TEK\_ADJ_{i\_updated} = AK_{new} \text{ XOR } AK_{old} \text{ XOR } TEK\_ADJ_i$$

$$TEK\_ADJ_{i+1\_updated} = AK_{new} \text{ XOR } AK_{old} \text{ XOR } TEK\_ADJ_{i+1}$$

where $TEK\_ADJ_{i\_updated}$ and $TEK\_ADJ_{i+1\_updated}$ denote the $TEK\_ADJ_i$ and the $TEK\_ADJ_{i+1}$ updated during the re-authentication, respectively, and $AK_{new}$ denotes the changed first parameter.

* * * * *